Aug. 21, 1956 L. W. ATCHISON 2,759,333
AIR CONDITIONING APPARATUS
Filed April 4, 1955
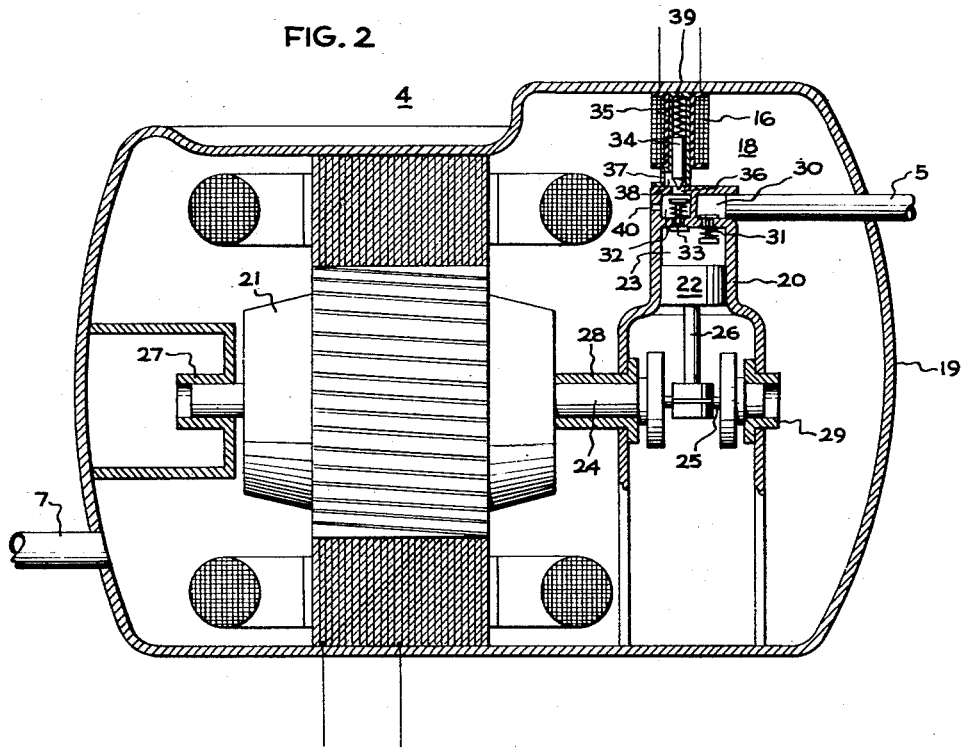
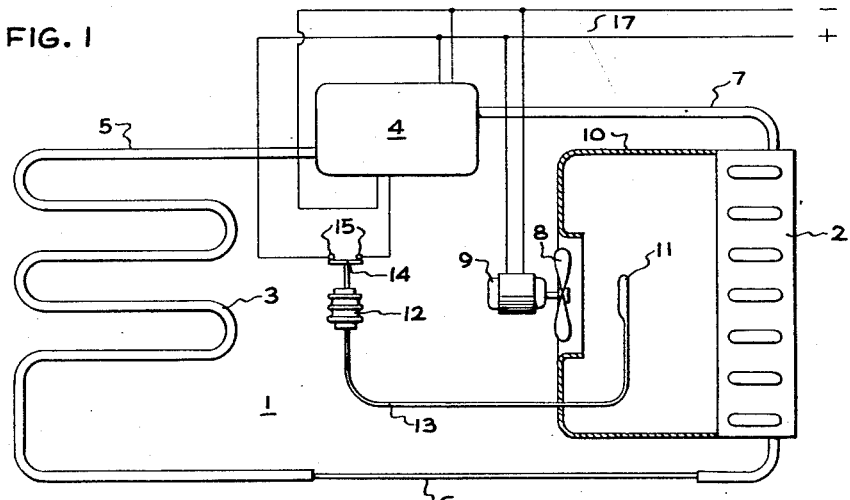
INVENTOR.
LEONARD W. ATCHISON
BY *Sheridan W. Briggs*
HIS ATTORNEY

United States Patent Office 2,759,333
Patented Aug. 21, 1956

2,759,333

AIR CONDITIONING APPARATUS

Leonard W. Atchison, Louisville, Ky., assignor to General Electric Company, a corporation of New York Application April 4, 1955, Serial No. 499,041

2 Claims. (Cl. 62—3)

My invention relates to air conditioning apparatus and more particularly to means for controlling the output capacity of such apparatus during its operation.

In order that a desired temperature may be maintained in the conditioned room or enclosure, air conditioning apparatus is customarily provided with means whereby its output capacity is controlled in response to room temperature. Normally this output control is effected by cycling the refrigeration system of the apparatus on and off. The refrigerant compressor is turned on when the room air rises slightly above the desired temperature and then is turned off when the apparatus has reduced the room temperature to slightly below the desired temperature. The refrigeration system runs at substantially full capacity whenever the compressor is in operation, and remains substantially inactive whenever the compressor is turned off.

From the standpoint of uniform power requirement a more desirable control is to have a continuously running compressor, whose output capacity is then varied during its operation. Such a control in addition has other advantages over the customary cycling control. Continuous operation of the refrigeration system tends to maintain a more uniform temperature throughout the conditioned room than is obtained when the system is cycled on and off. Continuous operation of the refrigerating system also avoids the objectional light flicker which often accompanies the starting of the refrigerant compressor on standard household circuits.

It is therefore an object of my invention to provide improved air conditioning apparatus having novel control means for controlling the capacity of the refrigeration system included therein, whereby the refrigeration system may be run continuously to maintain the desired temperature within the conditioned enclosure.

It is an other object of my invention to provide improved, continuously operating air conditioning apparatus having capacity control means in the refrigeration system thereof, which operate by control of the suction refrigerant entering the compressor cylinder.

A further object of my invention is to provide improved continuously operating air conditioning apparatus having capacity control means which operate by control of the suction refrigerant but which do not interfere with the cooling of the compressor by the suction refrigerant during reduced capacity operation.

In carrying out my invention I provide air conditioning apparatus having a refrigerating system including a pair of heat exchangers and a compressing unit. The compressing unit includes a compressor, a driving motor and a sealed casing enclosing the compressor and the motor. The interior of the casing lies in the path of the refrigerant flow through the compressor and the system, whereby the refrigerant flow acts as a motor coolant. Besides the refrigerating system the apparatus also includes thermostatic means for sensing the temperature of the conditioned enclosure and means associated with one of the heat exchangers for conditioning the enclosure. And by my invention, there is further included in the apparatus novel control means whereby the capacity of the refrigeration system is controlled to maintain a desired temperature in the conditioned enclosure. The control means includes a valve positioned within the sealed casing of the compressing unit for varying the suction or intake flow to the compressor, and a valve operator controlled by the thermostatic means for adjusting the valve. The valve, by its adjustment, varies the flow through the compressor and the capacity of the system in response to room temperature, but due to its positioning within the compressor casing, the valve is so arranged in the refrigerant flow path that refrigerant remains in the casing for the motor cooling even when the valve is closed. The control thus provides for effective regulation of the room temperature with continuous operation of the compressor.

The novel features of my invention are pointed out with particularity in the appended claims. My invention itself, however, both as to its organization and method of operation, may be best understood by reference to the following description taken in conjunction with the accompanying drawings in which:

Fig. 1 is a diagrammatic showing of an air conditioning unit including a preferred form of my new and improved capacity control means; and Fig. 2 is a sectional view of the compressing unit included in the apparatus of Fig. 1, this view showing a preferred form of the flow control arrangement included in my capacity control means.

Referring now to Fig. 1, I have shown therein air conditioning apparatus embodying my invention in one preferred form thereof. This apparatus, generally designated at 1, includes a refrigerant evaporator 2, a refrigerant condenser 3, and a refrigerant compressing unit 4. The evaporator 2, the condenser 3, and the compressing unit 4 are connected together with suitable expansion means so that they form a closed refrigeration system. Specifically, the discharge of the compressing unit 4 is connected to the condenser 3 by a discharge line 5; the condenser is connected to the evaporator 2 by a capillary expansion tube 6; and the evaporator is connected to the intake of the compressing unit 4 by a suction conduit 7. During the operation of the apparatus, the compressing unit 4 discharges hot gaseous refrigerant to the condenser 3. After being cooled and liquefied therein, the refrigerant passes through the capillary tube 6, being greatly reduced in pressure and temperature in the process. The cool expanded refrigerant is next evaporated by heat picked up in the evaporator 2 and then returns to the intake of the compressing unit 4 through the conduit 7.

The evaporator 2 has means associated therewith whereby the room or other enclosure is conditioned. Specifically, in my preferred embodiment, the evaporator 2 has a fan associated therewith whereby a flow of air is blown over it and into the enclosure to be conditioned during the operation of the apparatus. A fan 8 mounted behind the evaporator and driven by a suitable electric motor 9 is effective to set up the evaporator air flow, and a suitable duct, such as the duct 10, may be provided to cause the output flow from the fan 8 to pass over the evaporator and into the conditioned enclosure. In passing over the evaporator, the air stream is, of course, cooled thereby so that it produces a cooling effect upon being introduced to the conditioned enclosure. The intake to the fan 8 is normally taken from the conditioned enclosure through suitable duct work (not shown). However, it will be understood that, if desired, a portion or all of the evaporator air flow could be taken from the outside atmosphere.

The heat picked up from the conditioned air by the evaporator 2 is rejected from the refrigerating system by means of the condenser 3. I contemplate that my improved capacity control means may be utilized in the self-contained air conditioning apparatus of the type commonly known as room air conditioners; and in such case, the condenser 3 would be exposed to the outdoor air and would reject its heat thereto. Moreover, a fan would normally be provided for circulating a flow of outdoor air over the condenser and it will be understood that such a fan may be used with the illustrated apparatus. The use of my capacity control means is not limited to room air conditioners, however, and the condenser 3 can be cooled by other means than the outdoor air, as for example by a circulating water system, without in any way departing from my invention.

By my invention I have included in the apparatus 1 new and improved means for controlling the output to the room or other conditioned enclosure. These control means are so arranged that the compressing unit 4 is run continuously to maintain a desired temperature within the enclosure. In other words, these means control the capacity of the refrigeration system as the compressing unit runs continuously so that the desired temperature is maintained. The control means includes a thermostat which is positioned to sense the temperature of the conditioned enclosure. In my preferred embodiment, this thermostat comprises a temperature sensing hydraulic bulb 11 which is positioned within the duct 10 so that the evaporator air stream flows over it. The bulb 11 is connected to an expansible bellows 12 by a line 13 so that the bellows 12 expands and contracts in response to the room temperature.

The bellows 12 serves as the actuating means whereby the capacity of the refrigeration system is modulated as the compressing unit runs continuously during the operation of the apparatus 1. The bellows 12 has a contact arm 14 mounted thereon and this contact arm is movable by the bellows so as to open or close a pair of contacts 15. These contacts 15 are connected serially in the energizing circuit of a solenoid 16 (see Fig. 2) so that the solenoid is energized when the contacts are closed and is de-energized when the contacts are opened. The solenoid circuit preferably is energized from the same power supply 17 as the compressing unit 4 and the fan 8.

The solenoid 16 serves as a valve operator whereby a valve, generally designated at 18, may be operated between open and closed positions, and, as will be explained below, it is through the operation of this valve 18 that the capacity of my improved air conditioning apparatus is controlled. As shown in Fig. 2, both the solenoid 16 and the valve 18 are positioned within the casing 19 of the compressing unit 4. This casing 19 is of the hermetically sealed type and it completely closes off the refrigerant compressor 20 and its driving motor 21 from the surrounding atmosphere. By positioning the valve 18 within the casing 19, I obtain an improved capacity control having various advantages as explained hereinafter.

During the operation of the apparatus 1, the motor 21 drives the piston 22 of the compressor up and down in the compressor cylinder 23 so as to produce a pumping action effective to circulate the refrigerant charge through the refrigeration system. The piston 22 is driven from the motor by a driving connection comprising the shaft 24, the crank pin 25, and the connecting rod 26. The cylinder 23 and the shaft 24 may be mounted in any suitable manner and in Fig. 2 I have illustrated one arrangement which may be employed. In this arrangement, the shaft 24 is journalled in fixed, spaced-apart bearings 27, 28 and 29 and the compressor cylinder 23 is supported from the adjacent bearings 28 and 29. The bearings themselves are supported from the case by suitable frame members as shown.

In my preferred apparatus, the compressor discharge line 5 leads directly from the outlet of the compressor 20 through the casing 19 to the condenser 3. Specifically, the discharge line 5 is connected directly to the compressor discharge chamber 30 which is in direct communication with the outlet valve 31 of the compressor cylinder 23. The discharge valve 31 is shown as a simple spring biased poppet valve but it will be understood that other suitable discharge valving arrangements, as for example a flexible flapper valve, may be used.

The compressor suction line 7 leading from the evaporator 2 is however not connected directly to the compressor cylinder 23. Rather it empties into the interior of the casing 19 so that the cool suction gas from the evaporator flows around the driving motor 21 during the operation of the apparatus. The cool suction refrigerant thereby cools the motor 21 so as to keep it at a safe operating temperature. From the interior of the casing 19 the suction refrigerant is then drawn into the compressor 20. Specifically, the suction refrigerant flows through the valve 18 into the intake chamber 32 of the compressor. From the chamber 32 the refrigerant then passes into the compressor cylinder 23 through a suitable intake valve 33. The valve 33 is shown as a simple spring-biased poppet valve but, as with the discharge valve 31, it will be understood that different types of valves may be used. Thus during full capacity operation of the apparatus 1 the cool suction refrigerant enters the compressing unit 4 by means of the inlet line 7, passes around and cools the driving motor 21, and is drawn into the compressor 20 through the valve 18. After being compressed, the refrigerant is then discharged outwardly into the system through the discharge line 5 to provide a cooling effect as described above.

The valve 18 however serves as a means whereby this full capacity operation of the compressing unit 4 may be varied. Specifically, it serves as a means whereby the flow through the compressor 20 and thus through the entire system may be substantially cut off. When there is no refrigerant flowing through the refrigeration system, it of course has little or no cooling capacity, and thus by opening and shutting the valve 18 the capacity of the system may be varied between its extreme limits. In fact, by opening and shutting the valve in response to room temperature, as is contemplated by my invention, the capacity of the system is so controlled by the valve that a predetermined, desired temperature is maintained within the room or other conditioned enclosure.

The valve 18 in my preferred embodiment comprises a valve element 34 which is axially movable in a mounting member 35 into engagement with an intake port 36 leading to the compressor intake chamber 32. The valve element 34 is tapered at its lower end, as viewed in Fig. 2, so that it closes the port 36 when fully extended thereinto. However, when the valve element 34 is retracted from the port 36, the suction gas can flow without restriction through the valve 18 and into the compressor intake chamber 32. In such case the gas flows into the valve intake port 37, through a chamber 38 in the mounting member 35 and into the compressor intake 32 through the port 36.

The valve element 34 is normally biased into the port 36 by means of a spring 39 positioned behind it. In other words, the element 34 is spring biased so that it normally closes the intake to the compressor 20. However, the solenoid 16 is disposed around the member 35 mounting the valve element, and serves as a means whereby the valve element may be moved to its open position. When the solenoid 16 is energized by means of the bellows actuated contacts 14, it pulls the valve element 34 upwardly by electromagnetic action so that the port 36 is uncovered and full flow through the compressor may occur. In other words, when the solenoid 16 is energized, the valve 18 is opened so that the system operates at full capacity, whereas when the solenoid is de-energized, the valve is closed and the capacity of the system is substantially reduced.

The bellows 12 and the contacts 14 are so arranged that the contacts are closed whenever the room or other conditioned enclosure is above the desired temperature. Thus the valve 18 is held open by the solenoid 16 and the apparatus 1 operates at full capacity to lower the room temperature. Then, when the room temperature drops slightly below the desired level, the bellows 12 opens the contacts 14. This de-energizes the solenoid 16 allowing spring 39 to close the valve 18. The flow through the compressor and the system is thereupon stopped by the valve so that the system is unable to supply any appreciable refrigerating effect. The valve remains closed and the system inoperative until the temperature again rises to such a point that the bellows 12 closes the contacts 14. The above cycle then repeats itself. In this manner the valve 18 controls or modulates the capacity of the system to maintain the desired temperature in the room without the compressor 20 ever having to be shut off. Rather, the compressor runs continuously so long as the apparatus is in operation.

The positioning of the valve 18 so that it controls the compressor intake flow right at the compressor cylinder itself has several advantages. Being directly at the intake to the cylinder, it stops the gas pumping effect immediately upon being moved to the closed position. This, of course, reduces the capacity of the system very quickly before the room temperature is pulled down to still a lower point. The positioning of the valve at the cyilnder also has the advantage that no refrigerant storage problem is created. Any refrigerant which may be evaporated in the evaporator 2 after the valve is closed merely comes down the suction line 7 and is stored within the interior of the casing 19. Another very important advantage of this positioning of the valve 18 is that it provides for convection cooling of the motor 21 even when the valve is closed. Since the valve is right at the cylinder, the compressor is unable to pull any more refrigerant out of the casing 19 once the valve is closed. Thus the refrigerant in the casing 19 when the valve closes and any additional refrigerant which may come down the suction line 7 are available for cooling the motor so long as the valve is closed. In other words, a substantial amount of refrigerant remains in the casing even when the valve is closed so that it is churned around the motor and aids in its cooling. If desired, this natural convection can be supplemented by a small impeller or fan mounted on the shaft 24.

In my preferred embodiment there is also included an additional feature relative to the valve 18. Specifically, there is provided a small calibrated bleed 40 which leads directly from the interior of the compressor casing 19 into the compressor intake chamber 32 bypassing the valve 18. This bleed 40 provides for a very slight refrigerant flow through the compressor even when the valve 18 is closed. This slight flow is not enough to provide any appreciable refrigerating effect in the system. It does, however, purge or carry out any oil which collects in the compressor cylinder 23. Due to the vacuum created in the cylinder 23 when the valve 18 is closed, a small amount of compressor lubricating oil tends to accumulate therein, and this oil would cause a knocking noise if allowed to remain therein. However, the slight flow allowed by the bleed line 40 carries this oil out of the compressor so that no knocking is created.

From the above it will be seen that I have provided new and improved air conditioning apparatus in which effective capacity regulation is provided by control of the suction refrigerant flowing to the compressor. This control allows the compressor to run continuously but yet maintains the desired temperature within the room. By controlling the suction refrigerant within the compressor casing and right at the compressor cylinder, the pumping effect is ceased immediately upon the closing of the valve and no refrigerant storage problems are created. Further, due to this positioning of the control valve, refrigerant remains in the casing for motor cooling even when the valve is closed. Also, due to the bleed line bypassing the valve, oil cannot accummulate in the compressor cylinder when the valve is closed, and thereby knocking within the cylinder is avoided.

It will be understood, of course, that my improved control means could be utilized in reversible cycle refrigeration systems and in "heat pump" systems as well as in the illustrated cooling type of system. Further, the system does not necessarily have to be used to cool the room air directly. It could also, for example, be used to chill water, which would then in turn be pumped to suitable heat exchangers for cooling the room. In other words, means other than an evaporator fan could be associated with the heat exchangers of the system to condition the room air.

In accordance with the patent statutes I have described what at present is considered to be the preferred embodiment of my invention but it will be obvious to those skilled in the art that various changes and modifications can be made therein without departing from my invention, and I, therefore, aim in the appended claims to cover all such changes and modifications as fall within the true spirit and scope of my invention.

What I claim as new and desire to secure by Letters Patent of the United States is:

1. Apparatus for conditioning an enclosure comprising a refrigerating system including an evaporator, a condenser and a compressing unit, said compressing unit including a compressor, a driving motor and a sealed casing enclosing said compressor and said motor, the interior of said casing being in the path of refrigerant flow through said system whereby said refrigerant flow acts as a motor coolant, fan means for blowing a stream of air over said evaporator and into said enclosure thereby to condition said enclosure, thermostatic means for sensing the temperature of said enclosure, and means for controlling the capacity of said refrigerating system to maintain a desired temperature in said enclosure, said means including a valve positioned within said casing for controlling the intake flow to said compressor, said valve being arranged in the flow path through said casing and said compressor whereby refrigerant remains in said casing for motor cooling when said valve is closed, a bleed bypassing said valve to provide a small oil purging flow of refrigerant through said compressor when said valve is closed thereby to prevent knocking in the cylinder of said compressor, and a valve operator controlled by said thermostatic means for adjusting said valve in response to the temperature of said enclosure, thereby to control the refrigerant flow through said compressor and the capacity of said system.

2. Apparatus for conditioning an enclosure comprising a refrigerating system including an evaporator, a condenser and a compressing unit, said compressing unit including a compressor, a driving motor, and a sealed casing enclosing said compressor and said motor, a discharge line leading from said compressor through said casing to said condenser, a suction line leading from said evaporator to said compressing unit and emptying into said casing, whereby said casing is filled with cool suction refrigerant for cooling said motor, and a compressor intake leading from the interior of said casing to the cylinder of said compressor, fan means for blowing a stream of air over said compressor and into said enclosure thereby to condition said enclosure, thermostatic means for sensing the temperature of said enclosure, and means for controlling the capacity of said refrigerating system to maintain a desired temperature in said enclosure, said means including a valve positioned in said compressor intake between the interior of said casing and said compressor cylinder for controlling the intake flow to said compressor, said valve when closed preventing the withdrawal of suction refrigerant from said casing to said compressor, a bleed bypassing said valve to provide small oil purging flow of refrigerant through said compressor when said valve is closed thereby to prevent knocking in said compressor cylinder, and a valve operator controlled by said thermostatic means for adjusting said valve in response to the temperature of said enclosure, thereby to vary the flow through said compressor and the capacity of said system.

References Cited in the file of this patent

UNITED STATES PATENTS

| | | |
|---|---|---|
| 2,043,058 | Ploeger | June 2, 1936 |
| 2,169,554 | Buchanan | Aug. 15, 1939 |
| 2,328,824 | McCormack et al. | Sept. 7, 1943 |
| 2,366,188 | Gibson | Jan. 2, 1945 |

FOREIGN PATENTS

| | | |
|---|---|---|
| 379,601 | Great Britain | Sept. 1, 1932 |
| 393,080 | Great Britain | June 1, 1933 |